July 24, 1962 L. UBBELOHDE 3,045,416
FALSE TWISTING DEVICE
Filed Aug. 5, 1959 5 Sheets-Sheet 1
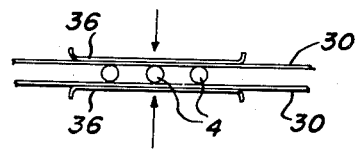
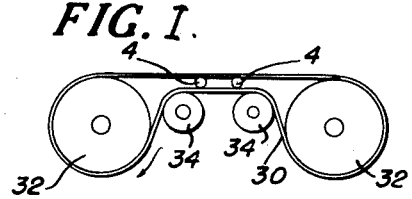
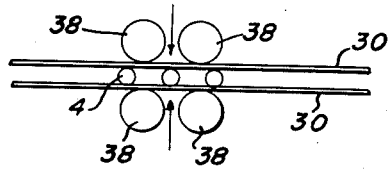
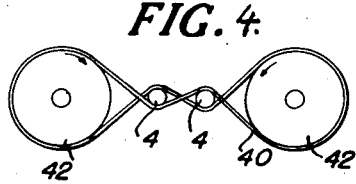
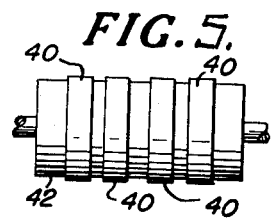
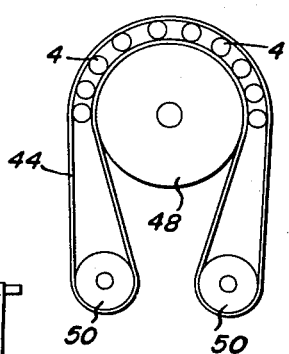
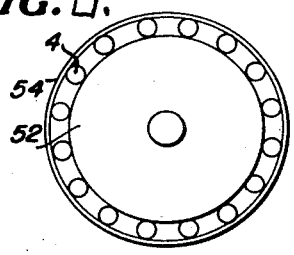
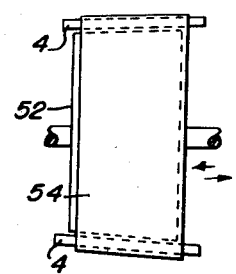

July 24, 1962  L. UBBELOHDE  3,045,416
FALSE TWISTING DEVICE
Filed Aug. 5, 1959  5 Sheets-Sheet 2
FIG. 10.
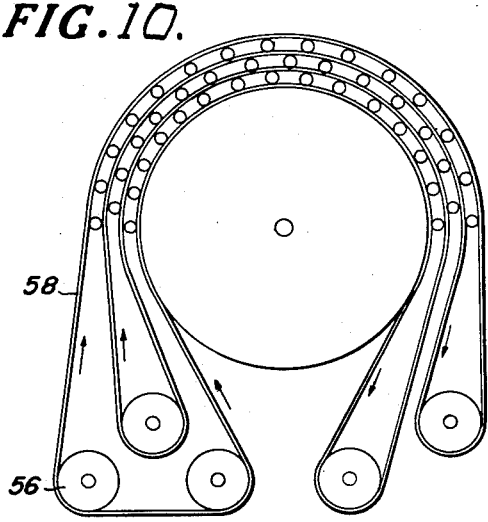
FIG. 12.
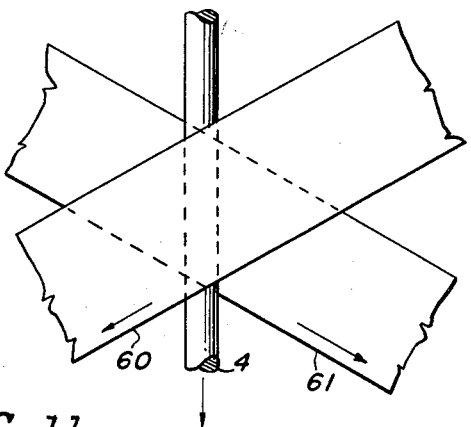
FIG. 11.
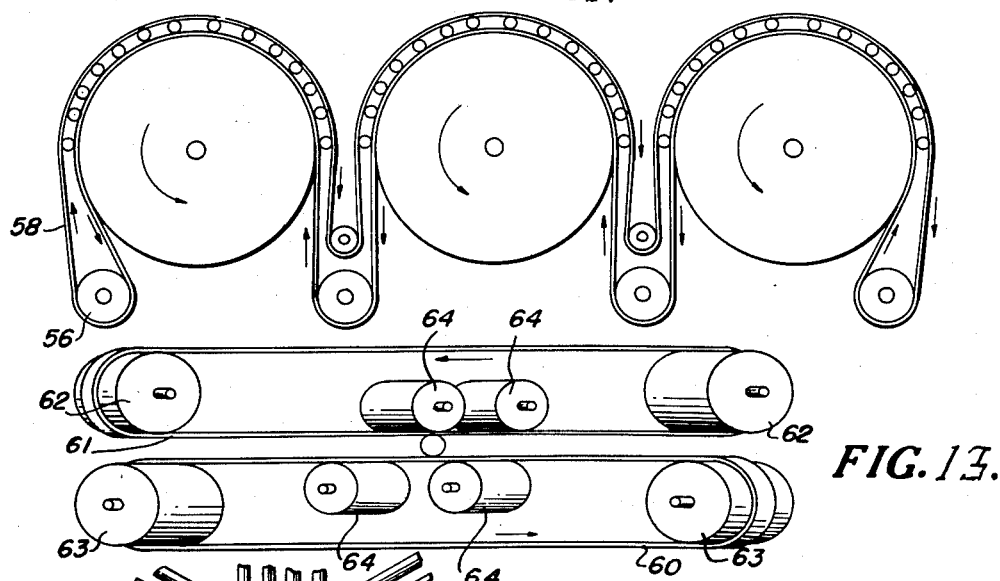
FIG. 13.
FIG. 14.
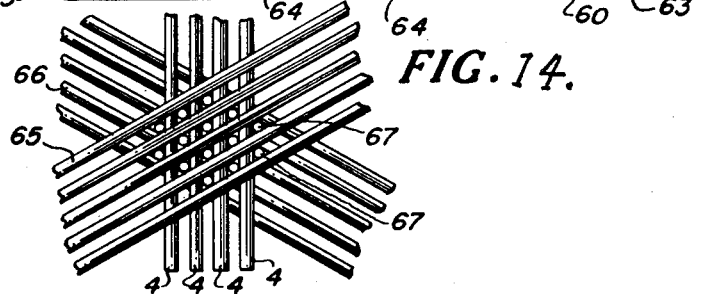

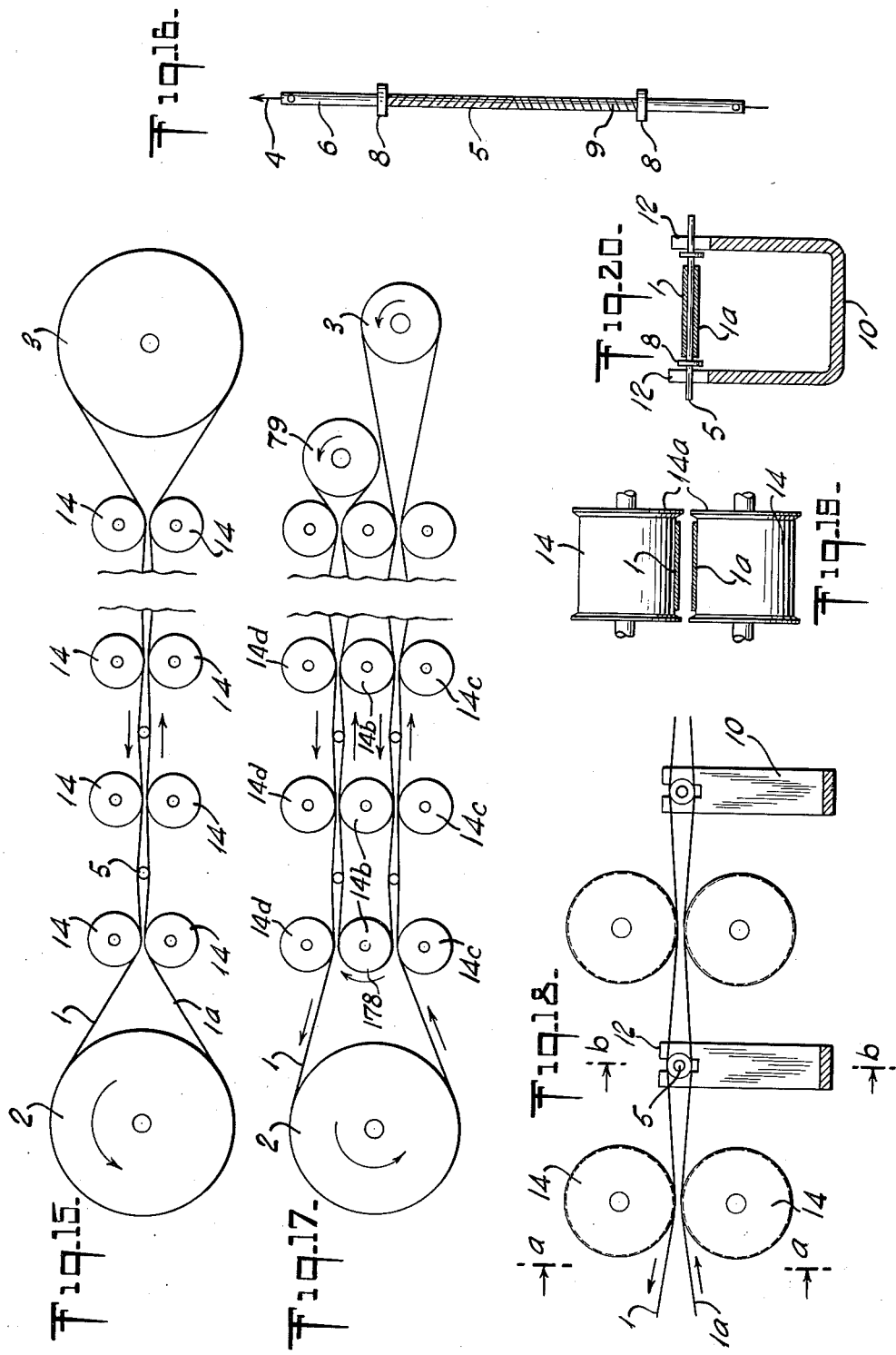

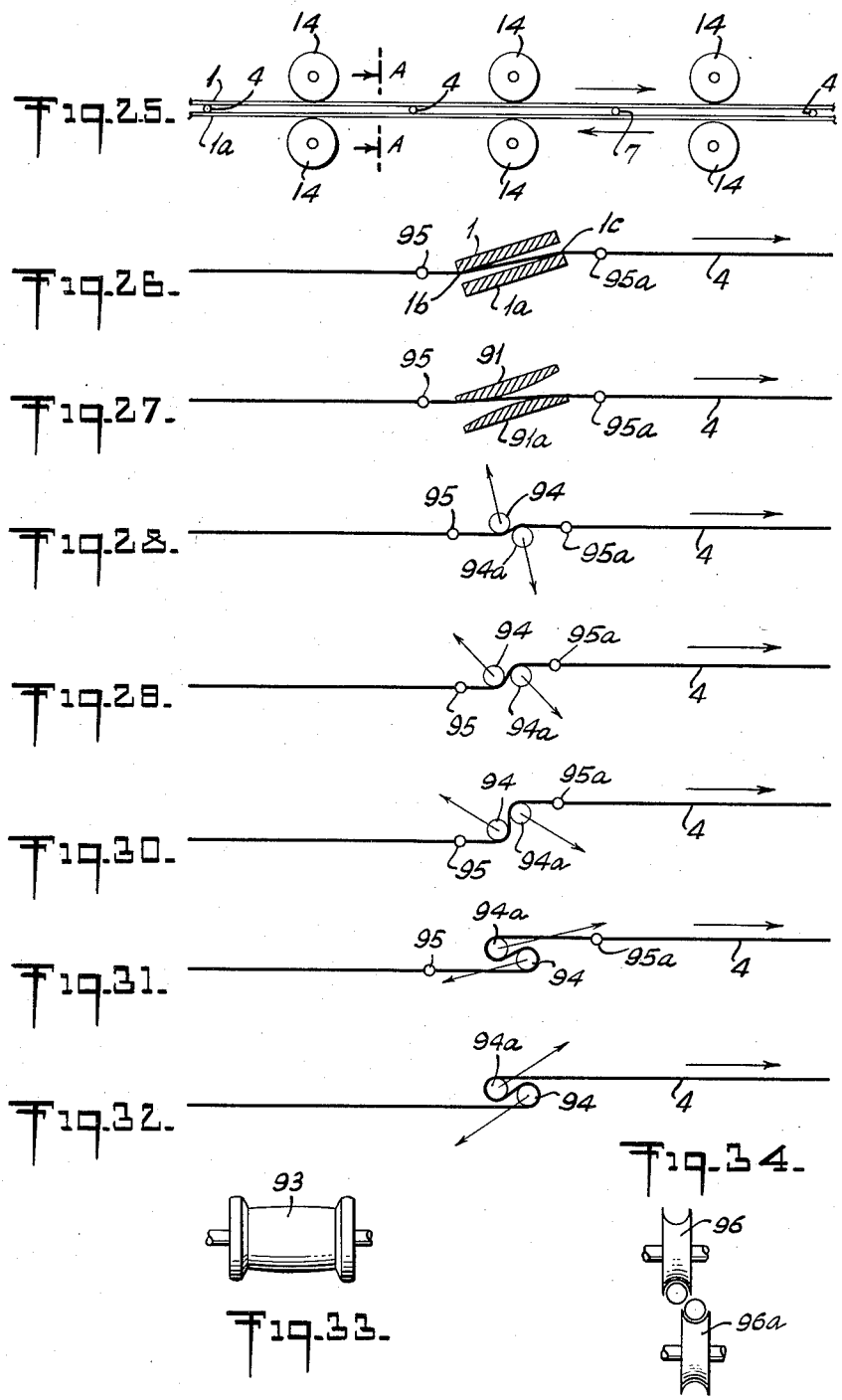

United States Patent Office 3,045,416
Patented July 24, 1962

3,045,416
FALSE TWISTING DEVICE
Leo Ubbelohde, 100 Lindemannstrasse,
Dusseldorf, Germany
Filed Aug. 5, 1959, Ser. No. 831,850
Claims priority, application Germany Sept. 15, 1958
3 Claims. (Cl. 57—77.45)

The invention relates to a novel false-twisting device for producing crimped filamentary materials, i.e. filaments, yarns, and fibers, possessing highly desirable properties.

This application is a continuation-in-part of my co-pending application Ser. No. 418,443, filed March 24, 1954, now Patent No. 2,991,614 for "False Twisting Apparatus for Producing Crimped Filamentary Materials," which in turn is a continuation-in-part of my application Ser. No. 349,285, filed April 16, 1953, now Patent No. 2,863,280.

My novel false-twisting device is particularly suitable for the crimping of synthetic linear polyamides such as nylon, and other thermoplastic full synthetic high polymers by the methods disclosed and claimed in said Patents No. 2,863,280 and No. 2,991,614; it allows of imparting to filaments or bundles of filaments a very high number of turns per meter in a very short period of time. It consists broadly in an arrangement where the two runs of an endless belt or cable are moved in closely spaced relationship at equal speed in opposite directions and rotate between themselves filaments or filamentary bundles either directly or in very small twisting tubes which are located between said runs. Only by using the runs of a single belt or cable which have inherently the same speed, it is possible to maintain the filaments or twisting tubes at the same place during the twisting operation. Suitable twisting tubes are disclosed and claimed, for instance, in my Patent No. 2,991,614.

The invention will be readily understood from the following description and accompanying drawings of preferred embodiments. In the drawings, FIGS. 1–3 show diagrammatically various arrangements of endless belts rotating the twisting tubes between their runs;

FIGS. 4 and 5 show an arrangement for twisting more than one filamentary bundle using a plurality of belts;

FIGS. 6 to 8 show devices where twisting tubes are arranged in a circle around a supporting roll;

FIG. 9 illustrates an arrangement where said roll is axially displaceable to adjust the pressure of the belt on the twisting tubes;

FIGS. 10 and 11 show an arrangement similar to FIG. 7 but including additional rolls so as to obtain an increased number of twisting positions with a single belt;

FIGS. 12–14 show a device where the belts or belt runs are arranged at an angle to each other;

FIG. 15 shows an arrangement where the runs of the belt are brought close together between the twisting tubes;

FIG. 16 shows diagrammatically one of the twisting tubes of FIG. 15 in approximately natural size, which tubes are described in more detail in my Patent No. 2,991,614;

FIG. 17 shows an arrangement like that of FIGS. 15 and 16 for a double acting twisting machine;

FIG. 18 shows the arrangement of holding means for the twisting tube;

FIGS. 19 and 20 are cross sections, taken on lines a—a and b—b of FIG. 18, respectively;

FIG. 25 shows diagrammatically a device according to the invention for twisting filamentary bundles directly, without the use of twisting tubes;

FIGS. 26 to 32 show various ways of arranging the relative filament contacting position of the two runs of the belt or cable of FIG. 25, and FIGS. 33 and 34 show guiding means for said runs.

Figure 21:
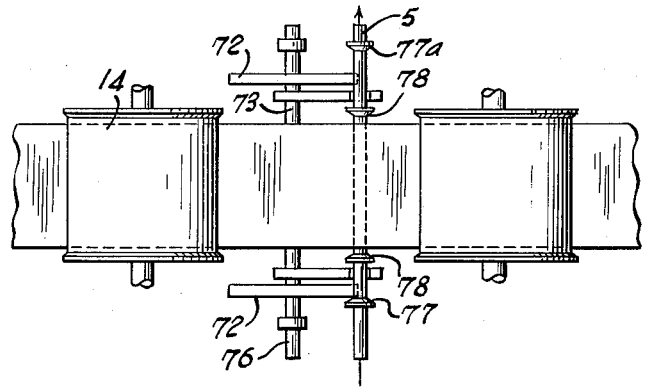
FIGS. 21 and 22 show, in plan and side view, the arrangement of supporting discs for the twisting tubes.
Figure 22:
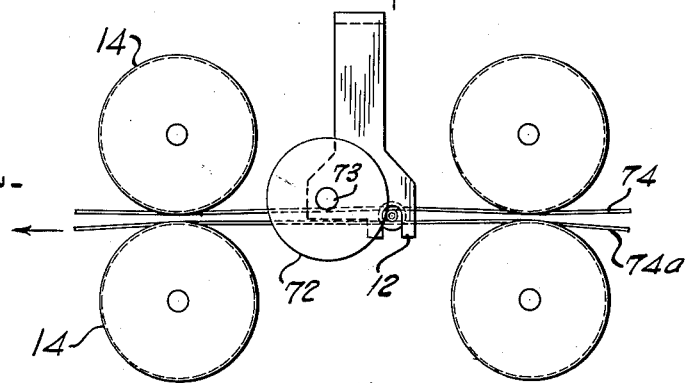

Referring more specifically to the drawings, the twisting arrangement shown in FIGURE 1 comprises an endless belt 30 mounted about a pair of rolls 32 and driven in the direction of the arrow by one or both of said rolls. Said rolls are driven in conventional manner so as to effect movement of the two runs of the belt in opposite directions. Such movement of the runs of the belt in turn exerts a rolling or twisting action on bundles 4 as they are drawn between the runs of the belt, in a direction normal to the belts. It will, of course, be appreciated that the bundles in FIGURE 1, as well as FIGURES 2 to 15, may be passed through twisting tubes, which are driven by contact with the belts. Insertion of a bundle alone, or of a bundle with twisting tube, between the runs of the belt 30 may be effected by forcing the runs from each other.

It is desirable to provide a pair of displaceable or movable rolls 34 which serve to equalize the pressure on bundles 4 as the latter pass between the runs of belt 30. In lieu of pressure rollers 34, there may be used a pair of oppositely disposed plate members 36 (as shown in FIGURE 2) or cooperating idler rolls 38 (FIGURE 3) urged against belt runs 30 in the direction of the arrows.

FIGURES 4 and 5 are illustrative of an arrangement for twisting more than one bundle using a plurality of belts. In this particular embodiment, four belts 40 are shown (FIGURE 5) with two bundles 4 although it will be appreciated that any number of belts and bundles may be satisfactorily employed.

As shown in FIGURE 5, the belts 40 are disposed side by side about rolls 42 and are so arranged that one run of each belt passes under one bundle and over the other bundle while the oppositely moving run of the same belt passes over the first bundle and under the second. In this way, movement of the belts by means of one or both of the rolls 42 in the direction of the arrows shown in FIGURE 4 brings about the desired rolling and twisting of the bundles.

The modification of FIGURE 6 includes an endless belt 44, driven by a roll 46, and another roll 48, driven in a direction opposite to that of the belt as shown by the arrows. The bundles 4 are passed between belt 44 and roll 48 and twisted thereby. A pair of rolls 50 acting against belt 44 serves to hold bundles 4 against roll 48 so as to insure proper twisting.

The arrangement of FIGURE 6 can be further modified, as shown in FIGURE 7, to eliminate the belt-driving roll 46. This is accomplished by guiding belt 44 about the rolls 50, at least one of which serves to drive the belt, and so positioning the belt with respect to roll 48 that the inner run of the belt directly contacts roll 48 and moves in a direction opposite to the outer run. The two belt runs, moving in opposite directions, can thus be used to twist a plurality of bundles 4 positioned therebetween.

The construction of FIGURES 8 and 9 includes a driving roll 52, the outer surface of which is slightly tapered, as best shown by the broken lines in FIGURE 9. Positioned about this roll 52 is a collar or a ring 54 whose inner surface is also tapered to correspond with the outer surface of roll 52. Collar 54 and roll 52 can be driven in opposite directions by conventional means so as to twist the several bundles 4.

As a further modification, roll 52 may be mounted for axial movement as shown by the arrows in FIGURE 9. In this way, the distance between roll 52 and ring 54 can be adjusted as desired so as to regulate the pressure on the bundles, or the tubes containing the same.

The modifications shown in FIGURES 10 and 11 are similar to the arrangement of FIGURE 7 except that the former include more rolls 56 so as to obtain an increased number of twisting positions with a single endless belt 58 driven in the direction shown by the arrows.

Inasmuch as the belt surfaces or the like used to twist the bundle move at equal speeds in opposite directions, the axis of the bundle or tube containing same should theoretically always remain in the same position. However, in actual practice, it is usually necessary to utilize some sort of guide means, e.g., pins, combs, forks, rolls, or the like, to prevent axial displacement of the bundles. In addition, it has been found that when tubes are used, a slight pull is exerted thereupon in an axial direction due to the drawing of the bundles therethrough. Accordingly, it is also desirable to include retaining means on these tubes in order to avoid any displacement thereof. This particular feature is more specifically discussed below.

As the bundles 4 are pulled through the twisting means shown in FIGURES 1 to 14, there is some tendency for the twisting surfaces to hold the bundles back. This difficulty can be overcome by increasing the pull on the bundle but it is undesirable to do this because it tends to remove or uncoil some of the twist given the bundle.

It has been found, however, that this holding back of the bundle can be satisfactorily avoided by positioning the belt runs in the manner of FIGURE 12, i.e., angularly with respect to each other, rather than parallel. In this way, movement of belt runs 60 and 61 in the directions indicated in FIGURE 12 not only rolls or twists bundle 4 but also exerts a resultant pull thereon in the same direction as the bundle is drawn, the extent of the pull being adjustable, as desired, by varying the angular disposition of belt runs 60 and 61. Stretching of the bundle for the purpose of increasing the elasticity or resilience of the crimp may also be effected in this way.

The belt arrangement of FIGURE 13 further illustrates the above-discussed feature of angularly positioning belts 60 and 61 with respect to each other. In this instance, however, the endless belts 60 and 61 are shown mounted for opposed movement on angularly disposed rolls 63 and 62, respectively, with the rolls 64, also angularly positioned, serving the same function as rolls 38 in FIGURE 3.

Where several bundles 4 are twisted side by side as shown, for example, in FIGURES 10 and 11, comb-like guides may be provided before or behind the belts to avoid entanglement. As an alternative, a plurality of relatively narrow belts 65 and 66 may be used, as shown in FIGURE 14, in conjunction with filament guides 67 positioned wherever belts 65 and 66 intersect.

In the arrangement of FIG. 15 a belt 1, 1a moves over the driven roller 2, a roller 3 and rotates between its runs 1 and 1a unsupported twisting tubes 5. In order to ensure uniform rotation of the tubes 5, supported guide roll pairs 14 force the two runs of the belt toward each other to a distance less than the diameter of the rolls 5, so that the belt runs partly encircle the tubes. Instead of pairs of rolls 14, single rolls may be provided alternately on the one and the other run of the belt.

The filamentary bundle 4 is drawn through the tube 5 in the direction of the arrow (FIG. 16) and exerts a certain pull on the tube, so that one of the discs 8, which are provided against axial displacement of the tubes and may be flat or of slightly conical shape, may abut against the edge of the belt (see FIG. 21). This causes the belt to be slightly raised against its weight so that it may be shifted against one rim 14a of the guide rolls 14 (FIG. 19). In order to prevent wear of the belt edges, the twisting tubes may be provided between the discs 8 over some length of their surface with helical grooves or ridges 9 which cause the belt to deflect the twisting tube from the edges (FIG. 16). Similarly, grooves or ridges may be provided on the rims of the guide rolls to keep the belt out of contact with the flanges. The rims of the guide rolls may also be slightly curved. In this way, pressure between the discs 8 and the belt edges, and pressure between the belt edges and the side-rims 14a of the guide rolls and the belt edges, is eliminated or reduced. In order to prevent longitudinal displacement of the twisting tubes, they rotate with considerable play between the forks 12 of holding device 10. There would be no frictional contact between the tubes 5 and forks 12 if the two runs of the belt would be uniformly stretched. However, the run 1 driven by the roller 2 is stretched elastically to a larger degree then the returning run 1a. As a result, the tube is pressed in the direction of travel of the run 1 against the respective prong of the fork 12. Such pressure is very slight, but at more than 100,000 turns per minute the tube may be excessively heated by dry friction with the prong.

As long as the filamentary bundle 4 travels through the tube 5 straight in direction of the arrow (FIG. 16), it will take up essentially the lateral pressure; but as there will be times when the twisting tube is rotated without the bundle, the friction can be largely removed by providing two circular supporting discs 72 between the tube and the guide rolls 14 which lie in the direction of travel of the belt. The diameter of said discs should be approximately 10 to 20 times the diameter of the tube 5 (FIG. 21). The common shaft 73 of the discs 72 lies free but is located closely behind the belt without contacting runs 1 and 1a. The discs 72 project so far adjacent the slot of the forks 12 that the twisting tube 5 no longer runs against a prong of the fork but against the disc and rotates the same. As the axle of the discs 73 has to take up only a very light thrust, it is sufficient that it has a diameter of only about 1.5 mm., so that it turns smoothly in its step bearing 76. The advantage of said supporting discs 72 is that the above mentioned dry friction is replaced by the lower friction in a lubricated bearing 76 of the shaft 73 which rotates 10 to 20 times more slowly.

The supporting discs 72 can additionally be used to take up the pull exerted by the bundle on the twisting tube. For this purpose, additional conical discs 77 and 77a are placed on tube 5 which contact the discs 72. As the edge of each disc 72 has the same speed as the tube, there is practically no friction.

Figure 24:
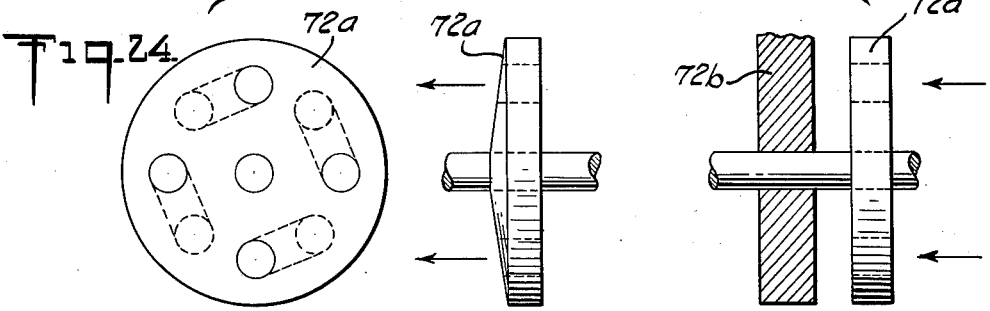
FIG. 24 shows details of friction reducing arrangements.

Any friction still remaining between the conical discs 77, 77a and the discs 72 or between the conical discs 78 (which correspond to the discs 8 of FIG. 16) and the edge of the belt 1 (FIG. 20) may be reduced further by making the cone of discs 77, 77a extremely shallow, and by designing the disc 72 as a fan, as is seen, for example, in disc 72a in the enlarged FIG. 24. The air current produced in the direction of the arrow in FIG. 24, forms an air cushion between the disc 72 in FIG. 21, and the belt edges in FIG. 20, and counteracts, therefore, the pull exerted by the filamentary bundle on the twisting tube, and reduces the friction.

The friction may be reduced also by producing an air current, by means of a very shallow ventilator cone attached to the twisting tube or by means of a very shallow ventilating disc, and by directing said current on a fixed plate 72b (FIG. 24).

Friction may also be reduced by placing the shaft of the two supporting discs 72 at a small angle to the direction of travel of the driven belt. Because of such asymmetric position of the shaft in relation to the belt, the supporting discs 72 press the twisting tube against run 74a of the belt, so that the tube exerts more force on run 74a than on run 74. This small difference in pressure, together with the above-mentioned greater force which run 74a exerts on the tube because of its greater elongation, biases the tube with the result that it receives pressure in a direction perpendicular to the direction of travel of the run 74a. This pressure opposes the pressure which the bundle of filaments being pulled through the tube exerts thereon. The angle of the shaft 73 of the two discs may be chosen so that the force which seeks to displace the tube is equal and opposite to that force which the bundle of filaments exerts through its motion on the tube, and that the tube is in equilibrium. The conical disc 77a (FIG. 21) then only serves to prevent any accidental excessive displacement.

Figure 23:
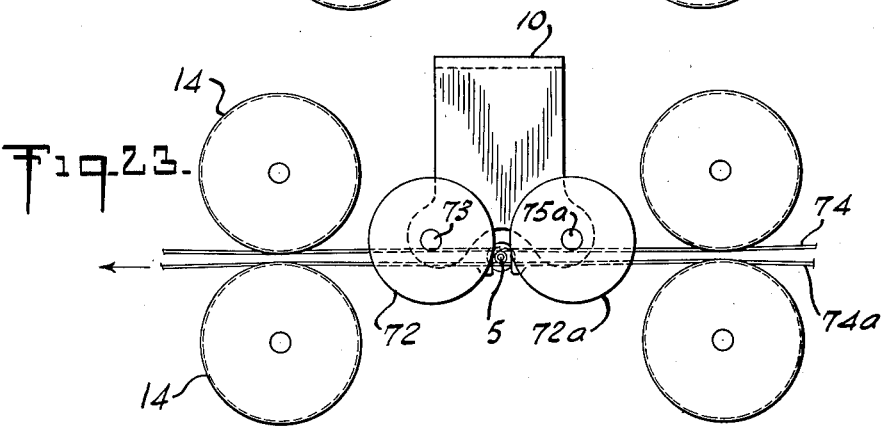
FIG. 23 shows a modification of the device of FIG. 22.

It is to advantage to provide supporting discs 72a, similar to the discs 72, on the other side of the twisting tube, as shown in FIG. 23. In this case, the prongs of the fork 12 may be omitted. Said discs 72a can take up the pull of run 74a of the belt when the direction of travel of the belt is reversed for changing the direction of twist of the filamentary bundle.

For double-acting machines, the belt may be directed as shown in FIG. 17, that is, around the driven roll 2, between guide rolls 14c and 14b, around roll 3, and back over the same path to roll 178. From roll 178, it passes between rolls 14d and 14b to roll 79, and back on its path to roll 2.

If a bundle of filaments breaks and must be rethreaded into the twisting tube, it is not necessary to stop the machine. The particular tube may be held fast with a pair of pliers until the bundle has been again threaded in.

When filaments or strands are twisted not in twisting tubes but by direct passage between the runs of a belt, there is the difficulty of passing the two runs of the belt in the proper spaced relationship through the guide rolls so that they are in sufficiently close contact with the very thin filaments without slide on each other and being worn.

In a specific embodiment of the invention, the filaments are drawn through the twisting device under tension in such a way that they contact the two runs of the belt not simultaneously but in a short interval. Suitable arrangements to obtain this result are shown in FIGS. 26 to 32, which are vertical sections along line A—A of the device of FIG. 25, omitting the guide rolls.

The runs 1 and 1a of the belt are spaced from each other by a distance which is slightly larger than the thickness of the filament, and form an angle with the direction of travel of the filaments. In this way, the filament 4 drawn under tension in the direction of the arrow contacts first the run 1 and immediately afterwards the run 1a which runs in a direction opposite to the travel direction of run 1, thereby rolling the filament. However, the filament contacts the belts only at the edges 1b and 1c, while half the width of the belt adjoining the edges is only slightly touched (FIG. 26).

The length of contact can be extended by giving a belt 91, 91a a cross section as shown in FIG. 27. In this modification, the curvature of the inner face of the belt contacts a larger portion of the inner surface, which produces a stranger rolling effect. This effect is increased by increasing the angle formed by the belt with the direction of travel of the filaments.

The contact between belt and filaments may be further increased by providing, instead of a flat or curved belt, a cable 94, 94a of circular cross section, as shown in FIGS. 28 to 32. By using cables of larger or smaller diameter, and by adjusting the angle between the direction of movement of cable and filaments, the contact area between cable and filaments is readily adjusted to the desired extent.

Of course, in all the devices shown in FIGS. 26 to 32, the filament is somewhat deflected laterally into the direction of travel of the belt. This effect is, however, essentially balanced by the draft with which the filament is pulled through the device, and can be further compensated by the guides 95 and 95a.

On the other hand, also the runs of the belt or cable are subject to a lateral displacement by the drawn filaments. This effect can be compensated by suitable stretch of the belt or by providing curved and flanged guide rolls 93 for the belt as shown in FIG. 33. Such curvature of the rolls deflects the belt inwardly and increases the curvature of the belt 91, 91a in FIG. 27. But even in a flat belt, the thus produced curvature may be sufficient.

For cables, I may use supporting rollers or discs which have a grooved circumference embracing half the cable and are arranged so as to take up the pressure exerted on the cable in the direction of the arrows (FIGS. 28–32).

In the embodiments of the invention shown in FIGS. 31 and 32, the relative position of the cable runs has been interchanged. As a result, the runs are drawn towards each other by the traveling stretched filaments. As the filament passes between the runs, the runs cannot slide on each other, but the runs should be kept spaced at the distance shown in FIGS. 31 and 32 by arranging supporting rolls 96, 96a so as to prevent the runs of giving in to the pressure of the filaments in direction of the arrows (FIG. 34).

The larger the diameter of the cable, the greater is the twisting effect. This effect can, therefore, be varied by using cables of different diameter.

The described arrangement produces twisting numbers far exceeding 10,000 turns per second for low belt or cable speeds.

The operation of the false twisting device for textile yarns, and particularly for nylon, will be apparent from the foregoing description, particularly with reference to my Patent No. 2,863,280 and to my Patent No. 2,991,614.

I claim:
1. A false twisting device comprising a pair of closely spaced opposed runs of a single belt, means for moving said runs in opposite directions at equal speeds, twisting tubes of relatively small diameter positioned between said belt runs and being rotatable by the movement thereof, spaced collar members on said tubes on opposite sides of said belt runs to restrict axial movement of said tubes, and at least one rotatable disc coacting with one of said collar members to take up the pull exerted by filaments drawn through said tube.

2. The false twisting device of claim 1 wherein said collar members are designed as fans pressing air against the belt edges and rotatable discs to eliminate frictional heating.

3. The false twisting device as claimed in claim 1 comprising a shaft for said rotatable disc asymmetrically arranged to the runs of the belt and at an angle to the direction of the belt movement, thereby imparting pressure on the tube in a direction perpendicular to the movement of the driven run and opposing the axial pull exerted by the filaments on the tube.

References Cited in the file of this patent
UNITED STATES PATENTS

| | | |
|---|---|---|
| 2,098,974 | Repass | Nov. 16, 1937 |
| 2,262,589 | Peck | Nov. 11, 1941 |
| 2,557,104 | Hegedüs | June 19, 1951 |
| 2,855,750 | Schrenk et al. | Oct. 14, 1958 |

FOREIGN PATENTS

| | | |
|---|---|---|
| 332,424 | Germany | Jan. 29, 1921 |